US010123355B2

(12) United States Patent
Youtz et al.

(10) Patent No.: US 10,123,355 B2
(45) Date of Patent: Nov. 6, 2018

(54) DEVICE-INITIATED CELL SELECTION SUBSEQUENT TO PROCEDURE FAILURE

(71) Applicant: Verizon Patent and Licensing Inc., Arlington, VA (US)

(72) Inventors: Andrew E. Youtz, Princeton, NJ (US); Lily Zhu, Parsippany, NJ (US); Joseph Peter Kuhn, III, Hamilton, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 159 days.

(21) Appl. No.: 14/929,289

(22) Filed: Oct. 31, 2015

(65) Prior Publication Data
US 2017/0126480 A1    May 4, 2017

Related U.S. Application Data

(60) Provisional application No. 62/247,587, filed on Oct. 28, 2015.

(51) Int. Cl.
*H04W 74/08*     (2009.01)
*H04W 48/20*     (2009.01)
*H04W 76/27*     (2018.01)

(52) U.S. Cl.
CPC ....... *H04W 74/0833* (2013.01); *H04W 48/20* (2013.01); *H04W 76/27* (2018.02)

(58) Field of Classification Search
None
See application file for complete search history.

(56) References Cited

U.S. PATENT DOCUMENTS

| | | | | |
|---|---|---|---|---|
| 7,941,155 B2 * | 5/2011 | Ji | | H04W 36/22 455/3.01 |
| 8,000,705 B2 * | 8/2011 | Kim | | H04W 76/027 455/435.1 |
| 8,270,371 B2 * | 9/2012 | Zhang | | H04W 36/02 370/328 |
| 8,548,469 B1 * | 10/2013 | Hietalahti | | H04W 76/027 370/328 |
| 8,737,336 B2 * | 5/2014 | Lohr | | H04W 72/042 370/329 |
| 8,831,555 B2 * | 9/2014 | Umatt | | H04W 4/22 455/404.1 |
| 8,837,369 B2 * | 9/2014 | Chen | | H04W 36/0066 370/328 |
| 8,909,227 B2 * | 12/2014 | Kitazoe | | H04W 36/0055 370/331 |

(Continued)

*Primary Examiner* — Steven H Nguyen

(57) ABSTRACT

A method includes attempting, by a computing device capable of connecting to a long term evolution (LTE) cellular network, to perform a first non-access stratum (NAS) procedure via a serving eNodeB associated with a serving cell included in the LTE cellular network. The first NAS procedure includes a radio access network (RAN) layer portion and a NAS layer portion. The method further includes determining that the first NAS procedure was unsuccessful due to a first NAS procedure failure. In response to the first NAS procedure being unsuccessful due to the first NAS procedure failure, a first alternate cell included in the LTE cellular network is selected, and there is an attempt to perform a second NAS procedure via a first eNodeB associated with the first alternate cell. The selection of the first alternate cell is initiated by the computing device.

20 Claims, 9 Drawing Sheets

(56) References Cited

U.S. PATENT DOCUMENTS

| | | | | |
|---|---|---|---|---|
| 9,049,698 B2* | 6/2015 | Johansson | H04W 76/027 |
| 9,155,121 B2* | 10/2015 | Rayavarapu | H04W 76/028 |
| 9,294,980 B2* | 3/2016 | Jun | H04W 36/22 |
| 9,326,227 B2* | 4/2016 | Gunaratnam | H04W 48/18 |
| 9,363,139 B2* | 6/2016 | Barrett | H04L 41/0806 |
| 9,432,856 B2* | 8/2016 | Lee | H04W 24/10 |
| 2007/0191010 A1* | 8/2007 | Kim | H04W 76/027 455/436 |
| 2009/0290555 A1* | 11/2009 | Alpert | H04W 4/20 370/331 |
| 2013/0039287 A1* | 2/2013 | Rayavarapu | H04W 76/048 370/329 |
| 2013/0095879 A1* | 4/2013 | Gupta | H04W 76/027 455/525 |
| 2013/0100795 A1* | 4/2013 | Zhao | H04W 36/0016 370/216 |
| 2013/0182563 A1* | 7/2013 | Johansson | H04W 76/027 370/228 |
| 2013/0183974 A1* | 7/2013 | Johansson | H04W 76/027 455/436 |
| 2013/0315205 A1* | 11/2013 | Liu | H04W 36/18 370/331 |
| 2014/0148169 A1* | 5/2014 | Li | H04W 36/0061 455/437 |
| 2014/0269275 A1* | 9/2014 | Jun | H04W 36/22 370/230 |
| 2014/0295838 A1* | 10/2014 | Won | H04W 60/04 455/435.1 |
| 2014/0355417 A1* | 12/2014 | Kim | H04W 24/04 370/221 |
| 2015/0023341 A1* | 1/2015 | Zhao | H04W 48/18 370/338 |
| 2016/0014681 A1* | 1/2016 | Yi | H04W 48/16 455/422.1 |
| 2016/0135247 A1* | 5/2016 | Ozturk | H04W 52/0212 455/436 |
| 2016/0183138 A1* | 6/2016 | Murakami | H04W 36/0061 370/332 |
| 2016/0192251 A1* | 6/2016 | Chebolu | H04W 36/0088 455/404.1 |
| 2016/0309523 A1* | 10/2016 | Zhang | H04L 69/28 |
| 2016/0381613 A1* | 12/2016 | Duan | H04W 36/24 370/331 |
| 2017/0048747 A1* | 2/2017 | Tiwari | H04W 48/06 |
| 2017/0245188 A1* | 8/2017 | Kim | H04W 36/165 |

* cited by examiner

DEVICE-INITIATED CELL SELECTION SUBSEQUENT TO PROCEDURE FAILURE

CROSS REFERENCE TO RELATED APPLICATIONS

This application claims the benefit of priority from U.S. Provisional Patent Application Ser. No. 62/247,587, filed on Oct. 28, 2015, and entitled "Device-Initiated Cell Selection Subsequent to Procedure Failure," which is incorporated by reference herein in its entirety.

BACKGROUND

To form a long term evolution (LTE) cellular connection, user equipment (UE), such as a mobile phone, will scan for a suitable cell. Upon locating and selecting a suitable cell, the UE will attempt to connect to a base station, or eNodeB (eNB), associated with the selected suitable cell. The UE will perform a random access channel (RACH) procedure in order to secure a radio resource control (RRC) connection with the eNB. After an RRC connection is successfully set up, the UE performs a non-access stratum (NAS) procedure by sending a NAS request to the network's mobility management entity (MME). Examples of NAS requests include attach, tracking area update (TAU), and service requests.

A successful LTE cellular connection requires both a successful RACH procedure and a successful NAS procedure. If there is a failure at the RACH level or the NAS level, the UE will retry to connect to the network via the initially selected, or serving, eNB. In conventional implementations of LTE standards, as long as basic suitability requirements are met, the UE will not attempt to connect via an eNB other than the serving eNB. However, in a situation of heavy radio congestion, such as in a stadium, the UE may not be able to connect successfully to the LTE network via the serving eNB. To this end, UE may continuously send connection request to the LTE network until the connection request is successful. This could further drain network resources.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry may have been described at a relatively high-level, without detail, in order to avoid unnecessarily obscuring aspects of the present teachings.

When a computing device (also known as "user equipment," or UE) initially identifies a suitable cell and attempts to connect to a cellular network (or to perform a procedure) via a base station associated with that initial cell, the attempt may fail for a number of reasons. In certain situations, the UE may receive instructions from the network to select another cell. However, in many cases, no such instructions are received, and the UE may repeatedly attempt to connect to the initial (serving) base station associated with the initially selected (serving) cell. If the serving base station is overloaded, the UE may not achieve a successful connection to the cellular network or perform a successful procedure despite repeated retry attempts. Techniques described below enable the UE to initiate selection of another cell after a procedure failure, even when the UE has not received instructions to do so from the network.

Figure 1:
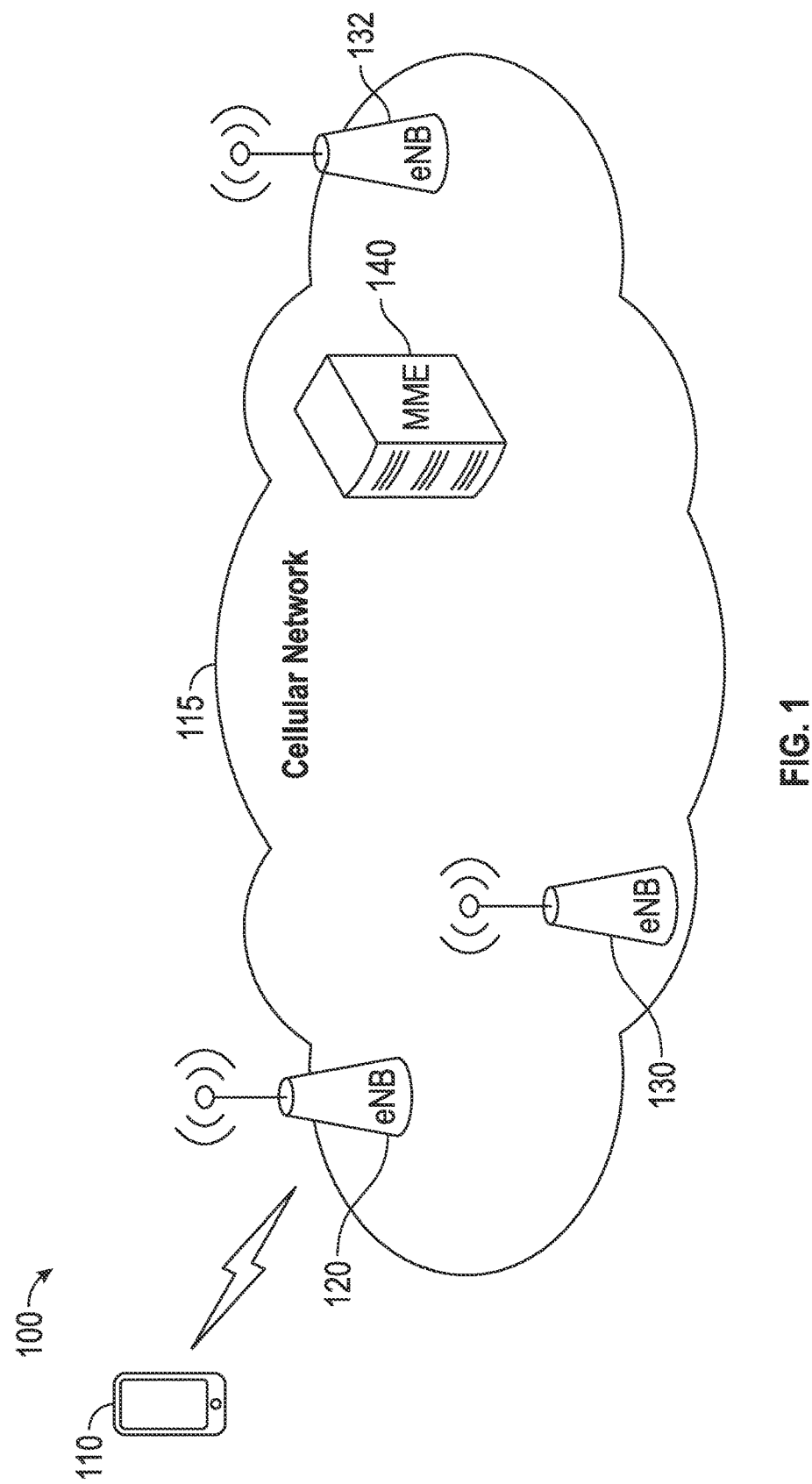
FIG. 1 is a high-level functional block diagram of an example system including a computing device and a cellular network with eNodeBs (eNBs) and a mobility management entity (MME).

FIG. 1 is a high-level functional block diagram of an example system including a computing device (UE) 110 and a cellular network 115 with base stations 120, 130, and 132, and a management entity 140. The base stations are represented as eNodeBs (eNBs), and the management entity illustrated is a mobility management entity (MME). The examples illustrated pertain to long term evolution (LTE) technology. However, the concept and disclosure of UE-initiated, which may also be referred to as "device-initiated," cell selection subsequent to procedure failure is not limited to LTE technology. Rather, the present teachings may apply to other types of radio access technology (RAT) such as GSM and CDMA, as well as 3GPP 3G RATs including UMTS/HSPA/HSPA+. Therefore, although FIG. 1 illustrates eNBs 120, 130, and 132, and MME 140 as examples, other types of base stations and management entities corresponding to RATs other than LTE may be substituted. Also, the UE 110 may have many different forms and variations. Some examples of these different forms and variations are described below in connection with FIG. 7.

The UE 110 is configured to perform a first non-access stratum (NAS) procedure via a serving eNB 120 associated with a serving cell. In order to perform the NAS procedure, the UE 110 attempts to establish a connection with serving eNB 120, and then establish successful communication with the MME 140 via the serving eNB 120. The UE 110 is configured to determine whether the first NAS procedure is unsuccessful due to a first NAS procedure failure. If the first attempt to perform a NAS procedure via the serving eNB 120 is unsuccessful, the UE 110 may initiate a selection of an alternate cell and attempt to perform a second NAS procedure via an alternate eNB 130 or 132 associated with the alternate cell. Examples of NAS procedures include, but are not limited to, attach, TAU, and service request procedures. A NAS procedure failure may occur at the random access network (RAN) level or at the NAS level. More detail regarding NAS procedure successes and failures is discussed below in connection with FIGS. 2-6.

Although FIG. 1 illustrates two alternate eNBs 130 and 132, the present teachings are not limited to two alternate eNBs. In certain cases, there may be a single alternate eNB. In others, there may be more than two. The number of alternate eNBs may be determined by, among other factors, the process used by the UE 110 to select a cell subsequent to procedure failure. More details regarding cell ranking and selection processes as well as the number of alternate eNBs is discussed below.

Figure 2:
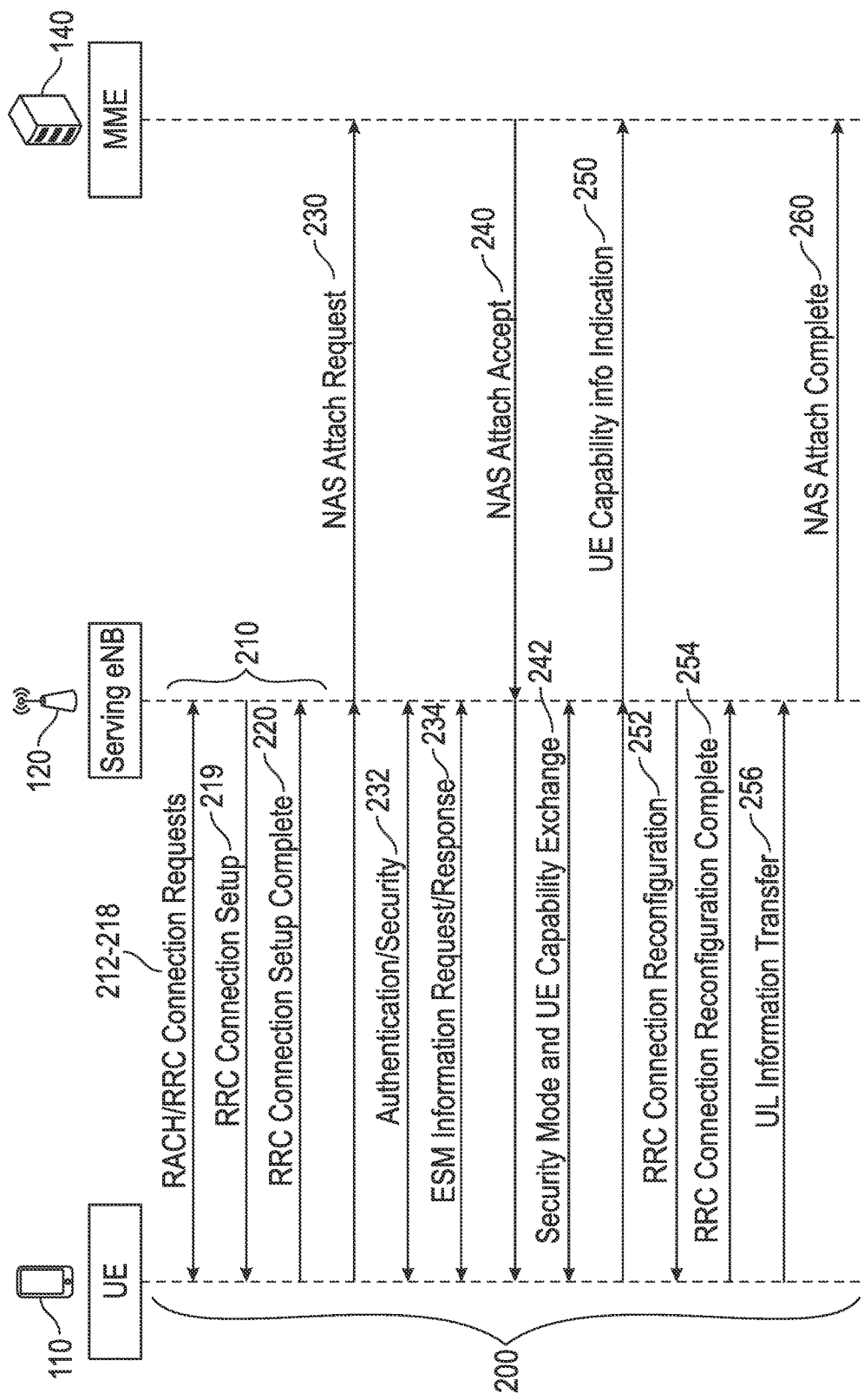
FIG. 2 illustrates an example of a successful NAS procedure via a serving eNB. The example illustrated is that of a successful NAS attach procedure.

FIG. 2 illustrates an example of a successful NAS procedure via a serving eNB. The example illustrated is that of a successful NAS attach procedure 200. The initial portion of the NAS attach procedure 200 is a random access network (RAN) layer portion 210. In the successful RAN layer portion 210 of the present example, a successful radio resource control (RRC) connection is established (219 and 220) between the UE 110 and the serving eNB 120. Once a successful RRC connection is established, the serving eNB 120 may forward the NAS attach request 230 from the UE 110 to the MME 140. In other examples, a TAU request, service request, or other type of NAS request may be substituted instead of an attach request. After authentication/security (232) and ESM information request/response (234) steps, in the successful attach procedure illustrated, the MME 140 will send a NAS Attach Accept message (240) to the serving eNB 120. After steps of security mode and UE capability exchange (242) between the UE 110 and serving eNB 120, UE capability info indication (250) is sent to the MME 140. The RRC connection between the serving eNB 120 and the UE 110 is then reconfigured (252 and 254), uplink (UL) information is transferred (256) from the UE 110 to the serving eNB 120, and the serving eNB 120 sends a NAS Attach Complete message (260) to the MME 140.

If the UE 110 fails to connect with the serving eNB 120 in the RAN layer portion 210, the RRC connection of steps 219 and 220 will not be established, and in many cases a conventional UE 110 may attempt to connect to the serving eNB 120 repeatedly without success. Similarly, if there is a failure at the NAS layer, and the UE 110 or serving eNB 120 fails to connect with MME 140 (e.g. the MME 140 does not respond with a NAS Attach Accept message 240), a conventional UE 110 may also repeatedly attempt to reconnect with the serving eNB 120, especially if there is no network-initiated means for the device to search for another cellular network or begin a process of cell reselection.

Furthermore, in certain implementations, NAS failures may include failures that would cause a message not to be received by UE 110 such as a malfunction or ceasing-to-function of a base station, a connection problem between the serving base station and a management entity, a malfunction or ceasing-to-function of the management entity, an overloaded management entity, or a malfunctioning router.

Figure 3:
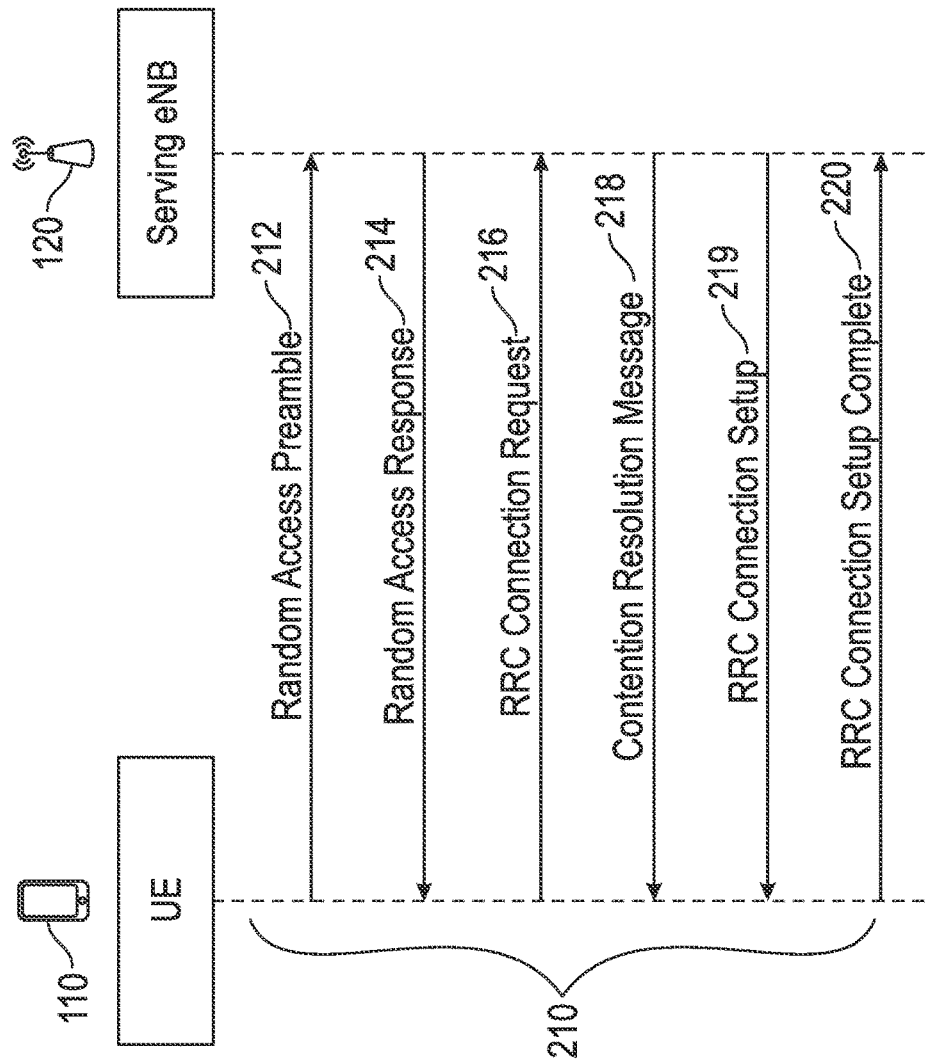
FIG. 3 illustrates in detail the random access network (RAN) layer portion of the NAS attach procedure illustrated in FIG. 2. In the example illustrated, connection at the RAN layer is successful.

FIG. 3 illustrates in detail the RAN layer portion 210 of the NAS attach procedure illustrated in FIG. 2. Similar RAN layer portions are included in successful TAU and service request procedures. In the example illustrated, connection at the RAN layer is successful. The RAN layer may include a random access channel (RACH) procedure. A successful RACH procedure may include the following six messages:
1) The UE 110 sends a random access (RA) preamble 212 to the serving eNB 120;
2) The serving eNB 120 provides an RA response 214;
3) The UE 110 sends RRC connection request 216 to the serving eNB 120;
4) The serving eNB 120 responds with a Contention Resolution Message 218;
5) The serving eNB sends RRC Connection Setup 219 to the UE 110; and
6) The UE 110 responds with a RRC Connection Setup Complete 220.

However, in many instances, the RACH procedure may not be successful. A RACH failure may include, for example, a failure of the serving eNB 120 to respond to the RA preamble 212 or to the RRC connection request 216. As another example, the RACH failure may include a reject response to the RRC connection request 216, instead of the Contention Resolution Message 218. The reject response may include a wait timer. In conventional implementations, the above examples of RACH failures may lead to continued retry attempts by the UE 110 to connect to the serving eNB 120. In cases where the serving eNB 120 is overloaded, in a very crowded network, or in another situation where the serving eNB 120 fails to complete a connection, the UE 110 may not be able to connect to the cellular network 115 via conventional methods. In sharp contrast, under the present teachings, device-initiated cell selection subsequent to procedure failure may be implemented that increases the likelihood and speed of successfully connecting the UE 110 to the network 115.

In some cases, there may be RAN procedure failures other than the failures listed above. As discussed below in connection with FIG. 4A, there may be a RAN failure where the serving eNB 120 responds to the RRC connection request 216 with a reject message including deprioritization instructions. There may also be RAN-type procedure failures corresponding to the ones listed above but relating to RATs other than LTE.

Figure 4A:
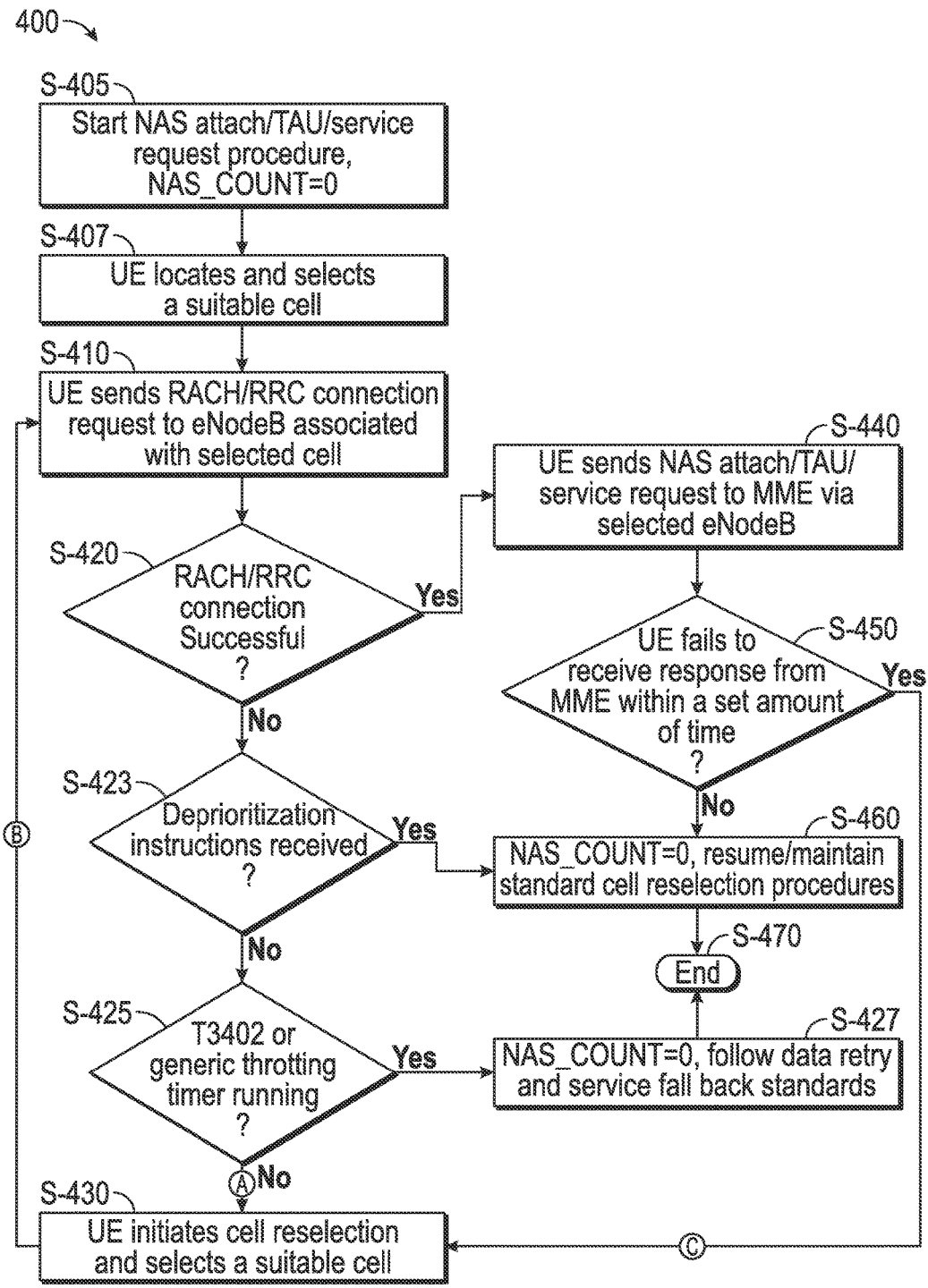
FIG. 4A illustrates an example process of device-initiated cell selection subsequent to procedure failure.

FIG. 4A illustrates an example process 400 of device-initiated cell selection subsequent to procedure failure. The example illustrated is an attempt to complete a NAS attach, TAU, or service procedure. In a successfully completed NAS procedure, the UE 110 connects to an MME 140 in the network 115 via an eNB, whether serving eNB or an alternate eNB such as eNB 130 or eNB 132.

The UE 110 may be configured to utilize a counter, herein referred to as NAS_COUNT. In this example, prior to or upon beginning the NAS attach, TAU, or service procedure, NAS_COUNT is set to 0 (S-405). NAS_COUNT is also set to 0 upon successful completion of an attach, TAU, service request, or detach procedure. In certain implementations, NAS_COUNT may be reset to 0 during a power cycle.

In order to perform a NAS procedure, the UE 110 locates and selects a suitable cell (S-407). Suitability may be based on current standards, such as 3GPP TS 36.304, which is incorporated by reference herein in its entirety, or the standards of a wireless communication carrier company. Prior to selection, cells may be ranked. An example of a ranking process is described below with regards to FIG. 4B. However, the selection method is not limited to the process described below. Any suitable cell may be selected. The cell initially selected at this point in the process may be referred to as the serving cell.

In step S-410, the UE 110 attempts to connect to the eNB associated with the selected cell by sending a connection request. The initial eNB that receives this connection request is referred to as the serving eNB 120. The initial connection request is sent at the RAN layer in a RACH procedure in order to secure an RRC connection. A more detailed description of RAN layer connections in LTE networks is included above with regards to FIG. 3. However, as discussed above, the present teachings are not limited to LTE technology, and other techniques for establishing a connection between UE 110 and network 115 via a base station may be included.

In step S-420, the UE 110, or another element, may determine whether the RACH procedure RRC connection has been successful. As discussed in connection with FIG. 3, a successful RACH/RRC connection may include a successful RA response 214 by the serving eNB 120. It may also include the sending of a Contention Resolution Message 218 from the serving eNB 120 to the UE 110. If it is determined that the RACH/RRC connection has been successful (S-420, Yes), process 400 continues with step S-440, as described further below.

If it has been determined that the RACH/RRC connection has not been successful (S-420, No), the failure may have taken a number of forms. As discussed with reference to FIG. 3, RACH/RRC failures may include a failure of the serving eNB 120 to respond to the RA preamble 212 or to the RRC connection request 216. They may also include the sending of a reject response to the RRC connection request 216, instead of the Contention Resolution Message 218, by the serving eNB 120 to the UE 110. If the eNB ignores the RA preamble 212 or the RRC connection request 216, a T300 timer described in 3GPP TS 36.331 may expire.

In certain cases, failure to complete an RRC connection may also include the sending of deprioritization instructions by the serving eNB 120 to the UE 110. Upon determining that the RACH/RRC connection has not been successful (S-420, NO), the UE 110 may determine whether deprioritization instructions have been received (S-423).

Deprioritization instructions may include or lead to network-initiated cell reselection. Therefore, in example process 400, if deprioritization instructions have been received by the UE 110 (S-423, Yes), NAS_COUNT is reset to 0, and standard cell reselection procedures may be followed (S-460). In this case, cell reselection may be performed according to 3GPP standards (for example, TS 36.304), according to data retry standards of a wireless carrier company, or according to other standards.

On the other hand, in many cases of RACH/RRC connection failure, deprioritization instructions may not be received by the UE 110 (S-423, No). In that case, conventional implementations may not provide the means, algorithm, or other method for retrying an alternate eNB 130 associated with a cell other than the serving cell. In sharp contrast, the present teachings introduce the possibility of device-initiated cell reselection subsequent to the procedure failures described above.

However, in example process 400, before device-initiated cell reselection is implemented, the UE 110 may determine whether a T3402 or a throttling timer (such as a generic throttling timer) is running (S-425). In certain standards, this timer may be a 12-minute timer. If such a timer is running (S-425, Yes), the network may initiate cell reselection under certain circumstances. In this case, NAS_COUNT is reset to 0, and data retry and service fall back standards may be followed (S-427). In certain implementations, these standards may be included in publications of wireless carrier companies. However, other standards may be applied.

In example process 400, if the UE 110 does not detect that a T3402 or a throttling timer is running (S-425, no), the UE 110 may initiate a cell reselection process (S-430). In the device-initiated cell reselection process, a suitable cell that has a lower priority that the serving cell may have the opportunity to be selected. In certain implementations, the highest priority cell may be selected intermittently. An example cell reselection process is described below with reference to FIG. 4B. However, as discussed below, the device-initiated cell reselection process is not particularly limited to the example illustrated in FIG. 4B. Variations on the device-initiated cell reselection process, as well as more detail regarding the determining of priority of cells, are also discussed further below.

Once the UE 110 has selected a suitable cell in step S-430, the process loops back to step S-410, and the UE 110 attempts to perform the NAS procedure (e.g. attach, TAU, or service request procedure, in this example) via the cell selected in step S-430. Thus, the UE 110 may send a RACH/RRC (RAN layer) connection request to the eNB associated with the selected cell (S-410). The selected cell may be the serving cell or an alternate cell, depending on the results of the device-initiated cell reselection process. Accordingly, the UE 110 may send the RAN layer connection request to the serving eNB 120 or to an alternate eNB (such as 130 or 132). If the UE 110 is not successful in establishing a RAN layer connection with the newly selected eNB (S-420, No), steps S-423-S-430 are repeated until the example process 400 reaches an end (S-470), for example by successfully completing the attempted NAS procedure, by reverting to network-initiated cell reselection, or by receiving other instructions via the network 115.

If, however, the RAN layer connection with the selected eNB is successful (S-420, Yes), the UE 110 continues to attempt to perform the NAS procedure via the selected eNB to which it is connected. Thus, the UE 110 sends a NAS request (such as, but not limited to, attach, TAU, or service request) to the MME 140 via the selected eNB (S-440). This is in an attempt to successfully perform the NAS procedure with the MME 140, as in the example of a successful NAS attach procedure illustrated in FIG. 2. In FIG. 2, the particular NAS request illustrated is the NAS attach request 230.

In step S-450, the UE 110 determines whether there is a procedure timeout at the NAS layer. In other words, the UE 110 determines if there is a failure to receive a response from the MME 140 within a set amount of time. The amount of time may be set by established standards such as 3GPP, or per the standards of a wireless carrier company. For example, the NAS procedure timeout may be determined by expiration of timers T3410, T3430, or T3417 defined in 3GPP TS 24.301.

If there is a procedure timeout at the NAS layer (S-450, Yes), process 400 proceeds to step S-430, and the UE 110 initiates cell reselection as discussed above with regards to FIG. 4A as well as below with regards to FIG. 4B. If, on the other hand, there is no procedure timeout at the NAS layer (S-450, No), and the UE 110 successfully receives a response from the MME 140, the attempt to complete the NAS procedure continues according to standard procedures.

Lack of a procedure timeout at the NAS layer (S-450, No) may mean that the UE 110 has successfully achieved a connection with the MME 140, and the procedure may continue successfully, as in the example illustrated in FIG. 2. For example, the MME 140 may respond to the UE's NAS attach request 230 with a NAS attach accept message 240. If the NAS attach procedure continues successfully, it may result in a NAS attach complete message 260. Once a NAS procedure is completed successfully, NAS_COUNT is set to 0 (S-460). Thus, process 400 may end (S-470) successfully.

Alternatively, lack of a procedure timeout at the NAS layer (S-450, No) may include the possibility that the MME 140 sends a reject message in response to the NAS request sent by the UE 110 in step S-440. If the MME 140 sends a reject message to the UE 110 at this point, NAS_COUNT is reset to 0, and standard procedures are maintained (S-460). At this point, the example process 400 of device-initiated cell selection subsequent to procedure failure may end (S-470), and in certain cases, the system 100 may revert to network-initiated cell reselection, or to another procedure.

Figure 4B:
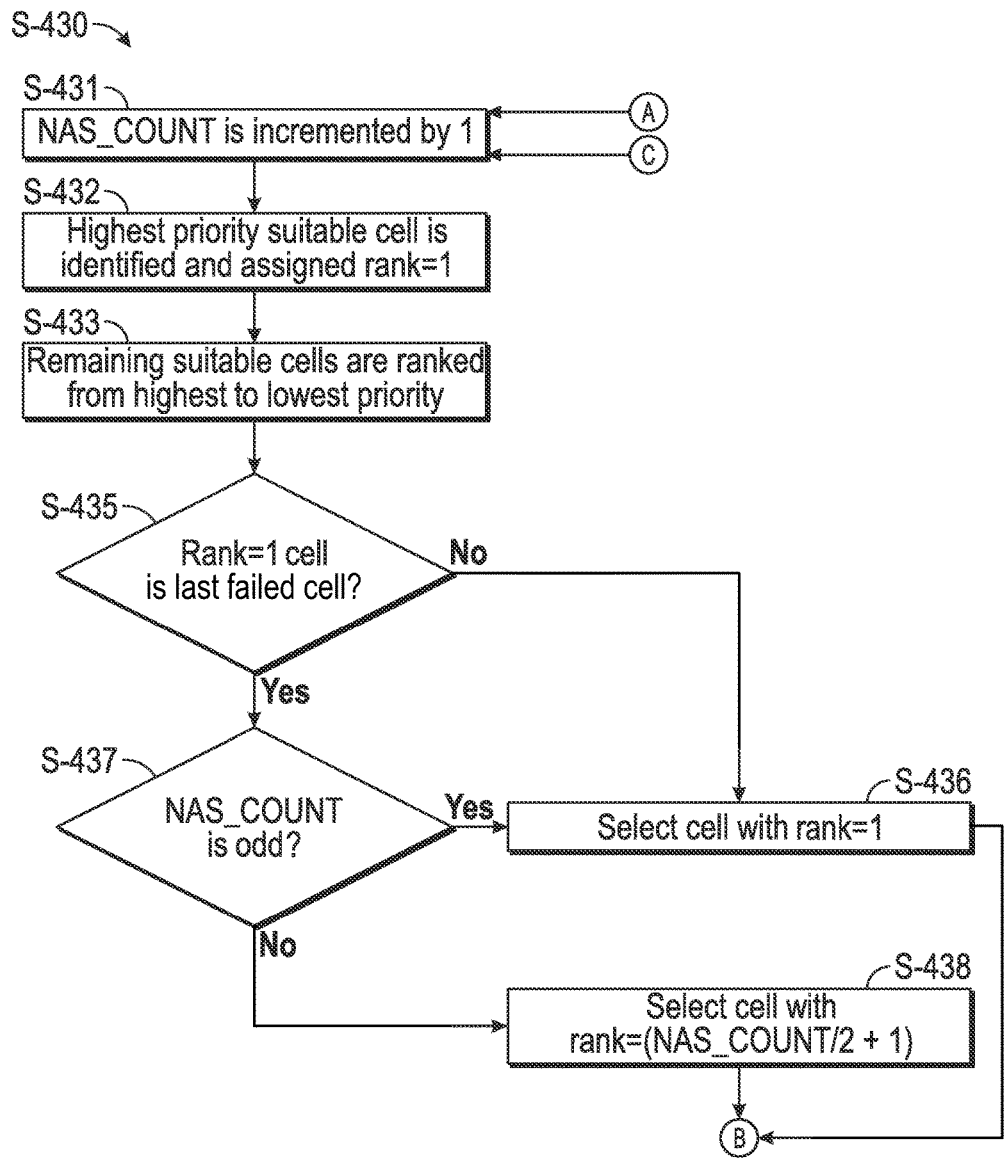
FIG. 4B illustrates in more detail an example of cell ranking and selection, which is a portion of the example device-initiated cell selection process.

FIG. 4B illustrates in more detail an example of cell ranking and selection (S-430), which is an example portion of the device-initiated cell selection process subsequent to a NAS procedure failure. The process 400 may arrive at step S-430 either through point A or point C. As is illustrated in FIG. 4A, process 400 may arrive at step S-430 through point A due to a RAN failure (S-420, No) with no deprioritization instructions (S-423, No), as long as there is no T3402 or throttling timer running (S-425, No). Alternatively, process 400 may arrive at step S-430 through point C, when there is a procedure timeout at the NAS layer (S-450, Yes). The example steps illustrated in FIG. 4B may apply in either case.

The sub-process of step S-430 as exemplified in FIG. 4B may begin by incrementing the NAS_COUNT counter by 1 (S-431). This allows the UE 110 to keep track of what number retry it is up to. For example, if this is the first failure since the start of the NAS procedure in step S-405 (FIG. 4A) to cause device-initiated cell reselection, NAS_COUNT will be incremented to 1. Otherwise, NAS_COUNT may be equal to 2 or more. Keeping track of the number of retries is not only useful for the current example of device-initiated cell reselection; it may also be useful for following other protocols, such as how many retries are allowed before a T3402 or a throttling timer is started.

In step S-432, the highest priority suitable cell may be identified and assigned rank=1. The UE 110 may rank cells according to suitability criteria in set standards such as 3GPP TS 36.304 or wireless carrier company protocol, or according to other ranking criteria. In certain implementations, as discussed above, the priority may be based on radio access technology (RAT), signal strength, bandwidth, frequency, or a combination of the above factors. As an example, the priority may be based on a suitability algorithm which ranks cells based upon a combination of signal strength, preferred bandwidth, and preferred frequency. However, priority in the present disclosure is not limited to the modes of cell ranking mentioned above. Rather, priority can be decided using other algorithms or in other ways.

In step S-433, remaining suitable cells may be ranked from highest to lowest priority. For example, the suitable cell next in priority to the cell with a rank of 1 will be assigned a rank of 2. If the UE 110 has located other suitable cells, they would be ranked 3, 4, 5, etc, until all identified suitable cells are ranked. In some implementations, ranking may not be performed each time step S-430 is performed.

In step S-435, the UE 110 may determine whether the cell with rank=1 is the cell for which the NAS procedure just failed. If it is not (S-435, No), the UE will select the cell with rank=1. Otherwise (S-435, Yes), the reselection sub-process continues to step S-437. In some implementations, step S-435 may not be performed.

In step S-437, the UE 110 determines whether NAS_COUNT is odd. If NAS_COUNT is odd (S-437, Yes), the UE 110 will select the cell with rank=1. Otherwise (S-437, No), since NAS_COUNT is not odd, it is known to be even, and the UE 110 will select the cell having a rank equal to NAS_COUNT/2+1 (S-438). In the event that the value of NAS_COUNT/2+1 is greater than the highest ranked cell, it may "wrap around" back to the cell having a rank of 2; for example, this "wrap around" might be implemented by a calculation such as modulo(NAS_COUNT/2−1, MAX_RANK−1)+2, where MAX_RANK is the highest identified rank.

In the example sub-process S-430 illustrated in FIG. 4B, steps S-436 and S-438 both lead to point B, which refers back to FIG. 4A. In each of those steps, the UE 110 has selected a suitable cell—either the cell with rank=1 (in S-436) or an alternate cell (in S-438). Therefore, each of those steps results in the UE 110 sending a RAN layer connection request to the eNB associated with the selected cell (S-410). In one example, if UE 110 identified three cells, ranked 1 through 3, in accordance with the example illustrated in FIG. 4B, UE 110 would perform NAS procedure attempts in a sequence of 1, 1, 2, 1, 3, 1, 2, 1, 3 . . . . In another example, if UE 110 identified four cells, ranked 1 through 4, in accordance with the example illustrated in FIG. 4B, UE 110 would perform NAS procedure attempts in a sequence of 1, 1, 2, 1, 3, 1, 4, 1, 2 . . . . In the above two examples, the serving cell consistently has rank=1. However, in the example sub-process S-430 illustrated in FIG. 4B, if a cell not selected in the previous attempt receives a rank of 1 (S-435, No), then the cell with rank=1 may be chosen (S-436) regardless of whether NAS_COUNT is even or odd.

It should be noted that the present teachings are not limited to the specific method steps illustrated in FIG. 4B. Other methods of device-initiated cell selection subsequent to procedure failure may be used. For example, in another example cell ranking and selection process, the alternate cell may be selected irrespective of whether NAS_COUNT is even or odd. In another implementation, alternate cells fulfilling a certain criteria of suitability may be selected randomly. In a third implementation, cell selection by the UE 110 may be timer-based. For example, the UE 110 may try a certain cell for a set amount of time, and then a different cell for a different amount of time. Therefore, in example process 400, step S-430 may include a form of device-initiated cell reselection not illustrated in FIG. 4B. Additionally, a similar cell reselection process may be implemented without use of counter NAS_COUNT. However, in each example, the UE 110 ultimately attempts on a retry to establish a connection through an alternate eNB after encountering NAS procedure failures.

Figure 5:
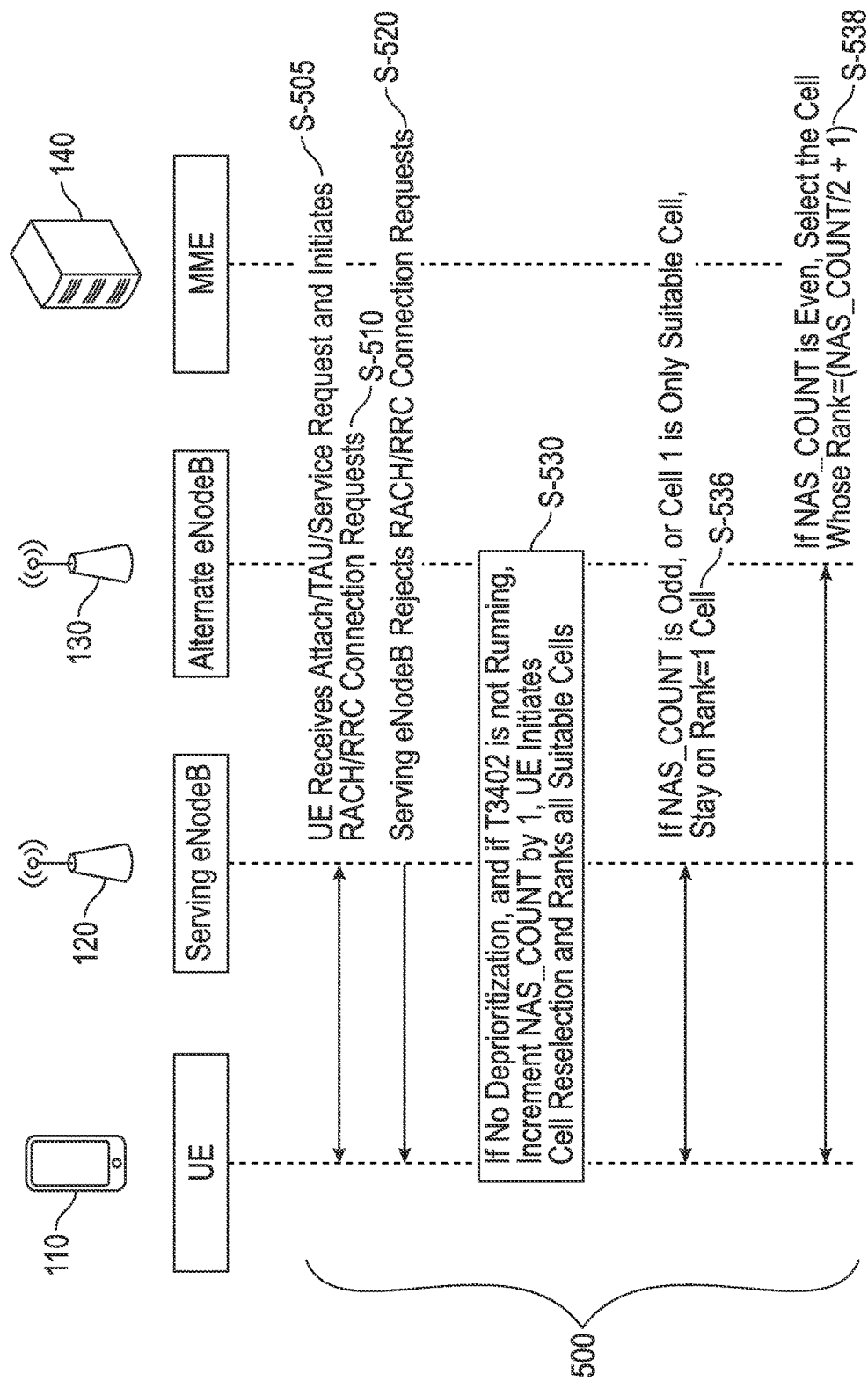
FIG. 5 is a specific example of the example process illustrated in FIG. 4A, wherein there is a first procedure failure at the radio access network (RAN) layer. The procedure failure is between the computing device and the serving eNB.

Process 500, illustrated in FIG. 5, is a specific example of the example process 400 illustrated in FIG. 4A. In process 500, there is a first procedure failure at the radio access network (RAN) layer. The first procedure failure is between the computing device (UE) 110 and the serving eNB 120.

The UE 110 may initiate process 500 when its modem or processor receives a NAS procedure request such as an attach, TAU, or service request from an upper layer (e.g. the application layer) of the UE 110 (S-505). At the start of process 500, NAS_COUNT is equal to 0. The UE 110 attempts to transmit the NAS procedure request to the MME 140 via the serving eNB 120. To do this, the UE 110 attempts to establish an RRC connection with the serving eNB 120.

The UE 110 attempts to establish an RRC connection with the eNB 120 by initiating RACH/RRC connection requests (S-510). These RACH/RRC requests may include steps illustrated in FIG. 3 such as sending an RA preamble 212 or an RRC connection request 216 to the serving eNodeB 120. If the UE 110 receives an RA response 214 from the serving eNB 120 to the RA preamble 212, the UE 110 may then send an RRC connection request 216 to the serving eNB 120.

In example process 500 illustrated in FIG. 5, the serving eNB 120 rejects the RACH/RRC connection requests (S-520). This could include sending a reject message instead of sending a contention resolution message (218 in FIG. 3). However, similar results would be obtained if instead of sending a reject message in response to RRC connection request 216, the serving eNB 120 would fail to respond to the RA preamble 212 or to the RRC connection request 216.

In any of these cases, the UE 110 may proceed to initiate cell reselection and rank suitable cells (S-530). This is especially relevant if there is no deprioritization message together with the reject message from the serving eNB 120, or if neither a T3402 timer nor a throttling timer is running. As described above with reference to FIG. 4A, if there are deprioritization instructions sent to the UE 110, or if T3402 or a throttling timer is running, there may be network-initiated cell reselection, which may eliminate the need for device-initiated cell reselection. However, in process 500, the UE 110 may initiate cell reselection and ranking as described in the example depicted in FIG. 4B. The UE 110 may rank cells according to suitability criteria in set standards such as 3GPP TS 36.304, or according to other ranking criteria. As per steps S-432 and S-433 in FIG. 4B, the highest priority cell may be assigned a rank of 1, and remaining cells may be ranked from highest to lowest as rank 2, 3, 4, etc. This ranking method is used in process 500, but the present teachings are not limited thereto.

In the cell selection process step S-536, if NAS_COUNT is odd, or if the cell with a rank of 1 is the only suitable cell, the UE 110 selects the cell with the rank of 1. The cell with rank of 1 may be the serving cell, in which case the UE 110 will retry the NAS procedure via the serving eNB 120. If the cell with the rank of 1 is not the serving cell but rather an alternate cell, the UE 110 will attempt to perform the NAS procedure via the alternate eNB (e.g. 130) associated with the alternate cell of rank 1.

In certain cases, the UE 110 may select an alternate cell even if the cell with the rank of 1 is the serving cell. In step S-538, if cell with rank 1 is not the only suitable cell, and NAS_COUNT is even, the UE 110 will select the cell whose rank is equal to NAS_COUNT/2+1. As explained above with regards to corresponding step S-438 in FIG. 4B, this will result in an alternate cell being selected.

Figure 6:
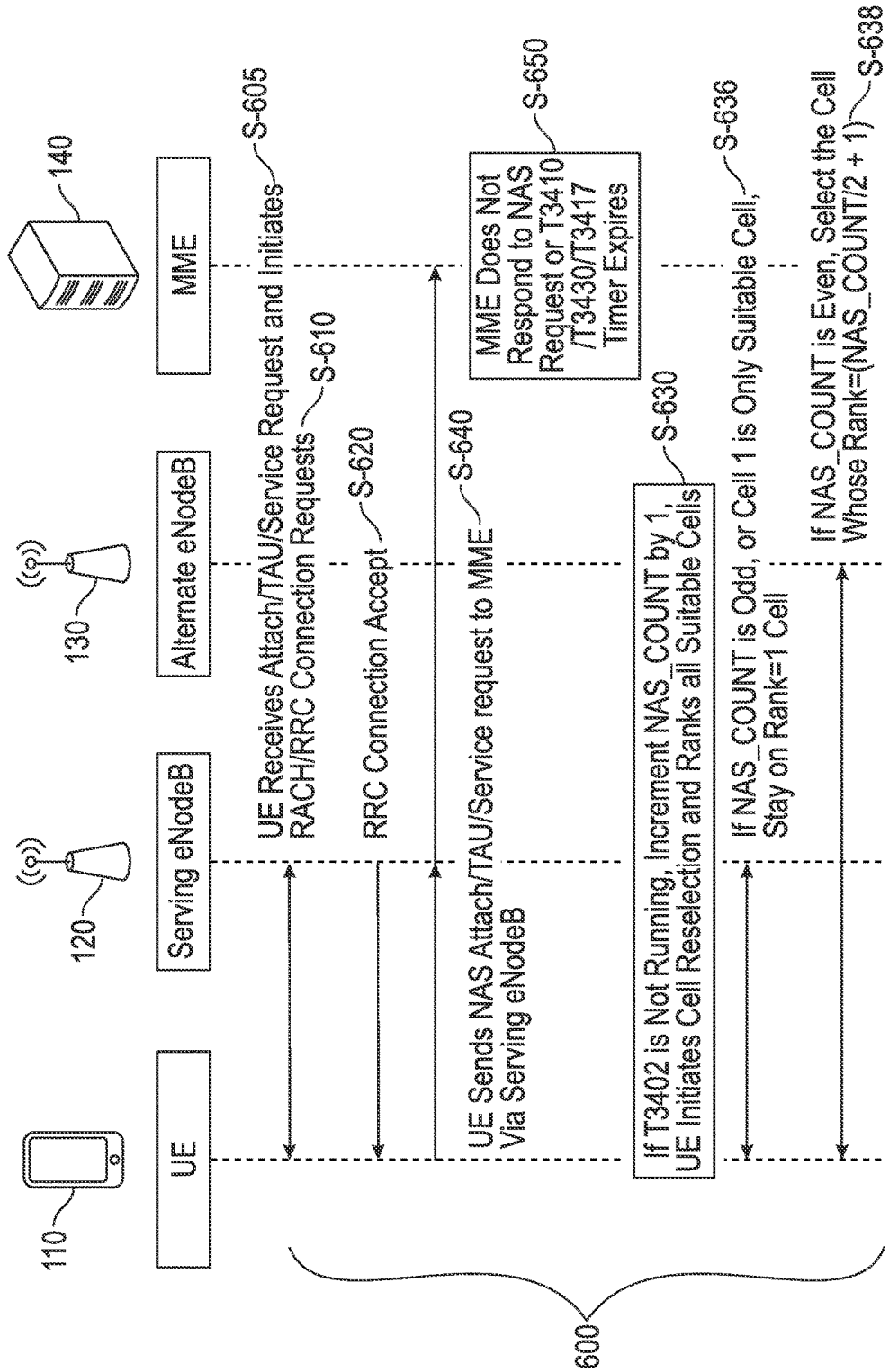
FIG. 6 is another specific example of the example process illustrated in FIG. 4A, wherein the initial RAN layer connection is successful, but there is a first procedure failure in the form of a NAS response timeout.

Process 600, illustrated in FIG. 6, is another specific example of the process 400 illustrated in FIG. 4A. Steps whose counterparts have been explained with regards to FIG. 4A will not necessarily be re-explained in detail with regards to process 600. Furthermore, a number of steps in process 600 are similar or identical to their parallel counterparts in process 500. Therefore, steps whose counterparts have already been explained in detail above with regards to process 500 will not be re-explained in detail with regards to process 600.

Process 600 differs from process 500 in that in process 600, the initial RAN layer connection is successful, resulting in the serving eNB 120 sending an RRC Connection Accept message to the UE 110 (S-620). As a result, the UE 110 may continue to attempt to perform the NAS procedure by sending a NAS request to the MME 140 via the serving eNB 120 (S-640). In process 600, the first procedure failure is in the form of a NAS response timeout (S-650). The NAS response timeout in step S-650 occurs when the MME does not respond to the NAS request or when timer T3410, T3430, or T3417 expires. This is a procedure timeout at the NAS layer.

In example process 600, the UE 110 responds to the NAS response timeout in step S-650 in the same or similar fashion as it responds to the RAN layer connection failure in step S-520 in process 500. This corresponds to point A and point C in FIG. 4A both leading to device-initiated cell reselection in step S-430. Therefore, steps S-630, S-636, and S-638 in FIG. 6 respectively correspond to steps S-530, S-536, and S-538 in FIG. 5 and have already been explained above.

In processes 500 and 600, as well as in the cell ranking process of steps S-431-S439 in FIG. 4B, the first retry (for example, when NAS_COUNT equals 1) may be directed to the serving eNB 120. If NAS_COUNT was 0 at the beginning of sub-process 430 in FIG. 4B, and is then incremented by 1, NAS_COUNT will equal 1 at the first retry. According to the above examples, if the serving cell has the rank of 1 while NAS_COUNT=1, the UE 110 stays on the serving cell and retries the serving eNB 120. However, the present teachings of device-initiated cell selection subsequent to procedure failure are not limited thereto. In certain implementations, the first retry may be to an alternate eNB 130. For example, the UE 110 may attempt to connect to an alternate eNB 130 prior to retrying the serving eNB 120 if in the cell ranking process subsequent to procedure failure, an alternate eNB 130 receives the rank of 1.

Further, in the above examples, as long as the serving cell retains the rank of 1, connection attempts alternate between an alternate eNB (e.g. 130 or 132) and the serving eNB 120. NAS_COUNT increases incrementally, and the serving eNB 120 is tried when NAS_COUNT is odd (i.e. every other time). When NAS_COUNT is even, an alternate eNB (e.g. 130 or 132) is tried. However, the present teachings are not limited to this specific alternating case. In other examples, the serving eNB 120 may be alternated with only a single alternate eNB 130. In other cases, there may be no alternating, and alternate eNBs may be tried consecutively.

Also, in S-438, S-538, and S-638, respectively, as long as the serving cell retains the rank of 1 and NAS_COUNT is even, the alternate cell selected is NAS_COUNT/2+1. Therefore, the first alternate eNB 130, associated with the cell ranked 2, is tried on the first even try (NAS_COUNT=2, cell rank=2/2+1=2). The second alternate eNB 132, associated with the cell ranked 3, is tried on the second even try (NAS_COUNT=4, cell rank=4/2+1=3). However, the present teachings are not limited to this order. In other cases, the first alternate eNB 130 may be tried more often than the second alternate eNB 132. In some implementations, only one alternate eNB might be tried. Alternatively, two or more alternate eNBs may be tried, in any given order. The number of alternate eNBs is not particularly limited to two; there can be any number of alternate eNBs.

Figure 7:
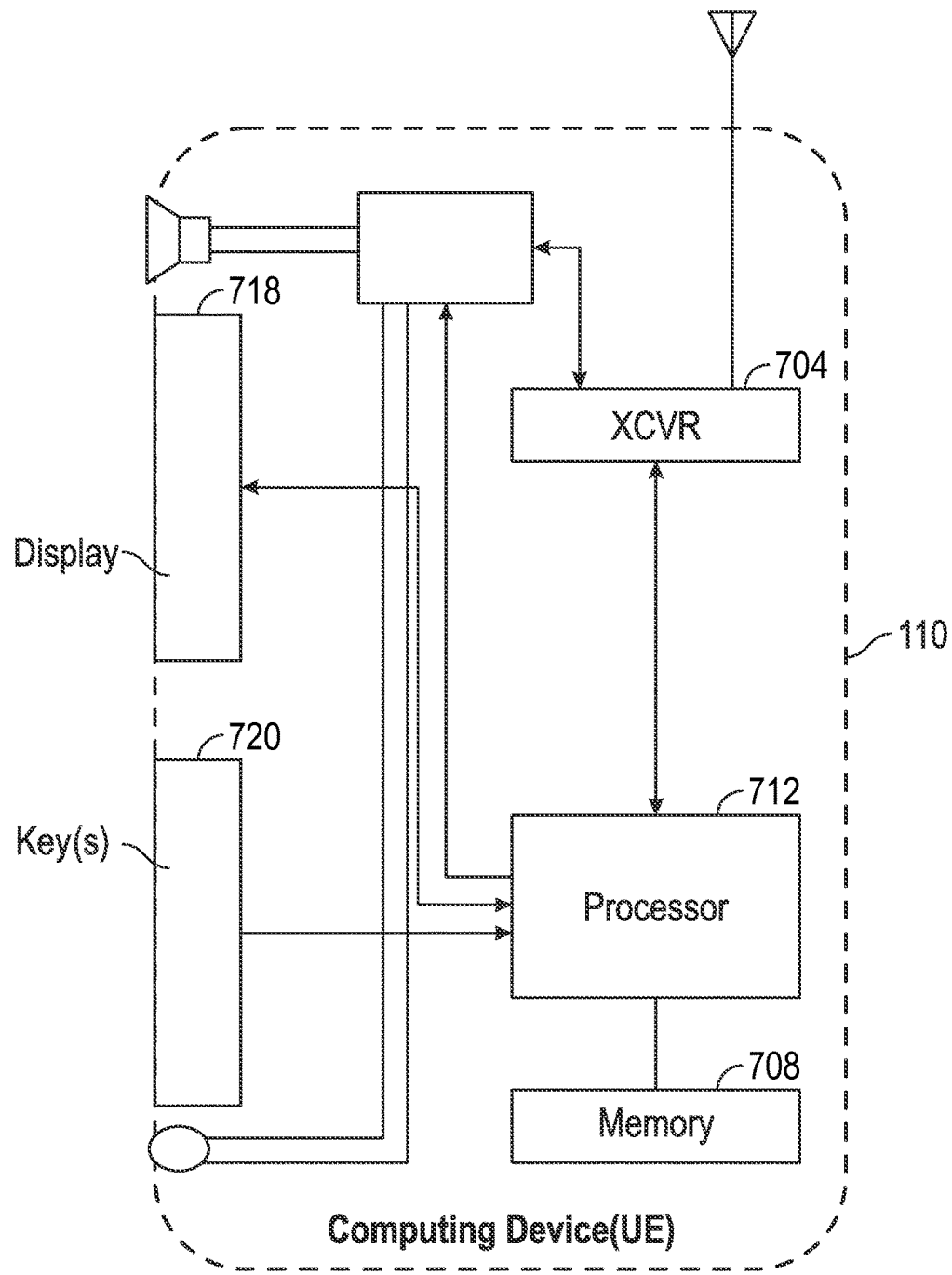
FIG. 7 is a high-level functional block diagram illustrating an example of a computing device that may utilize disclosed techniques by attempting to connect to a cellular network.

FIG. 7 is a high-level functional block diagram illustrating an example of a computing device 110 that may initiate cell selection subsequent to procedure failure. The computing device, or UE, 110, is not particularly limited to a specific type of device, but may include any computing device capable of connecting to a cellular network 115. Examples of UE 110 may include a smartphone, a tablet, a basic phone such as a flip-top phone, a laptop or other computer, and a motor vehicle with cellular communication capabilities. The UE 110 may be configured for digital wireless communications using one or more of the common network technology types.

As illustrated in FIG. 7, the UE 110 may include a transceiver 704, a memory 708, and at least one processor

712. The transceiver 704 may be configured to transmit or receive data. The concepts discussed here encompass embodiments of UE 110 utilizing any digital transceivers that conform to current or future developed digital wireless communication standards. The UE 110 may also be capable of analog operation via a legacy network technology.

The memory 708 may be configured to store the data transmitted or received via the transceiver 704 or from an external source. The UE 110 may include includes flash type program memory, for storage of various "software" or "firmware" program routines and mobile configuration settings. The UE 110 may also include a random access memory (RAM) for a working data processing memory. Of course, other storage devices or configurations may be added to or substituted.

The processor 712 may be configured to cooperate with the transceiver 704 and the memory 708. In certain implementations, the processor 712 may be a microprocessor. The processor 712 may be further configured to attempt to perform a first non-access stratum (NAS) procedure via a serving eNodeB 120 associated with a serving cell and determine whether the first NAS procedure is unsuccessful due to a first NAS procedure failure. The processor 712 may also be configured to, if the first NAS procedure is unsuccessful due to the first NAS procedure failure, initiate a selection of a first alternate cell and attempt to perform a second NAS procedure via a first alternate eNodeB 130 associated with the first alternate cell. In addition, the processor 712 may be configured to perform the example processes illustrated in FIGS. 2-6 and variations thereof.

The UE 110 may further include a display 718 for displaying messages, menus or the like, call related information dialed by the user, calling party numbers, etc., including data usage information for various data communications service over the mobile communication network. Key(s) 720 enable dialing digits for voice and/or data calls as well as generating selection inputs, for example, as may be keyed-in by the user based on a displayed menu or as a cursor control and selection of a highlighted item on a displayed screen. The display 718 and keys 720 may be physical elements providing a textual or graphical user interface. The keys 720 may form part of a keypad. Alternatively, if the UE 110 includes a touch screen, there may be only a single key 720 or a limited number of keys 720.

From the perspective of the customer, having a disclosed computing device, such as UE 110, capable of performing device-initiated cell selection subsequent to procedure failure, may increase the chances that a mobile device will be able to access the network in a situation where network access would have otherwise been limited or impossible within a given time frame. From the perspective of the network, having computing devices connect to an alternate base station after a procedure failure with a serving base station may allow the serving base station to recover more quickly.

In one aspect, this disclosure provides a method including attempting, by a computing device capable of connecting to a long term evolution (LTE) cellular network, to perform a first non-access stratum (NAS) procedure via a serving eNodeB associated with a serving cell included in the LTE cellular network. The first NAS procedure includes a radio access network (RAN) layer portion and a NAS layer portion. The method further includes determining that the first NAS procedure was unsuccessful due to a first NAS procedure failure. In response to the first NAS procedure being unsuccessful due to the first NAS procedure failure, a first alternate cell included in the LTE cellular network is selected, and there is an attempt to perform a second NAS procedure via a first alternate eNodeB associated with the first alternate cell. The selection of the first alternate cell is initiated by the computing device.

In certain implementations, the method may further include attempting to perform an additional NAS procedure via the serving eNodeB before attempting to perform the second NAS procedure and in response to the first NAS procedure being unsuccessful due to the first NAS procedure failure.

The first NAS procedure failure may include a failure in the RAN layer portion of the NAS procedure. However, the present teachings are not limited thereto.

In certain implementations, the RAN layer portion may include sending a random access (RA) preamble and sending a radio resource control (RRC) connection request, and the first NAS procedure failure may include a random access channel (RACH) procedure failure.

In certain examples, the RACH procedure failure may be a failure of the serving eNodeB to respond to the RA preamble. In other examples, the RACH procedure failure may be a failure of the serving eNodeB to respond to the RRC connection request. In yet other examples, the RACH procedure failure may include reject response by the serving eNodeB to the RRC connection request, and the reject response may possibly not include deprioritization instructions.

In certain cases, the NAS layer portion may include sending a NAS request message and receiving a response to the NAS request message, and the first NAS procedure failure may includes a failure to receive a response to the NAS request message.

In certain implementations, the NAS request may include an attach request, tracking area update (TAU) request, or service request.

The computing device may be configured to alternatingly try to connect via the serving eNodeB and the first alternate eNodeB. However, the present teachings are not limited thereto.

In certain implementations, the first alternate eNodeB may include a single eNodeB associated with an alternate cell included in the LTE cellular network having highest priority after the serving cell.

In other implementations, a second alternate eNodeB may be associated with a second alternate cell included in the LTE cellular network. The first alternate cell may have a higher priority than the second alternate cell, and the computing device may attempt to connect to the first alternate eNodeB before trying to connect to the second alternate eNodeB. In some of these implementations, the computing device may be configured to alternatingly attempt to connect via the serving eNodeB and via at least one of the first and second alternate eNodeBs. However, the present teachings are not limited thereto.

In certain cases, the method may further include determining priorities for the serving eNodeB, first alternate eNodeB, and second alternate eNodeB based upon signal strength, bandwidth, or frequency.

Another implementation includes a non-transitory computer readable medium including instructions which, when executed by at least one processor included in the computing device, cause the computing device to perform device-initiated cell selection subsequent to procedure failure.

In another aspect, this disclosure provides a device that may include a transceiver and a processor. The transceiver may be configured to transmit or receive data from a long term evolution (LTE) cellular network. The processor may be configured to attempt, via the transceiver, to perform a first non-access stratum (NAS) procedure via a serving eNodeB associated with a serving cell and determine that the first NAS procedure was unsuccessful due to a first NAS procedure failure. The processor may also be configured to, in response to the first NAS procedure being unsuccessful due to the first NAS procedure failure, select a first alternate cell and attempt to perform a second NAS procedure via a first alternate eNodeB associated with the first alternate cell.

In certain cases, the first NAS procedure failure may include a failure of the serving eNodeB to respond to a random access (RA) preamble or to a radio resource control (RRC) connection request, a reject response by the serving eNodeB to the RRC connection request, or a failure of a mobility management entity (MME) to respond to a NAS request In another aspect, this disclosure provides a system including a computing device capable of connecting to an LTE cellular network. A serving base station, or eNodeB, may be associated with a serving cell included in the LTE cellular network. The system may also include a management entity such as an MME included in the LTE cellular network. An alternate base station, or eNodeB, may be associated with an alternate cell included in the LTE cellular network. The computing device may be configured to attempt to perform a first non-access stratum (NAS) procedure via the serving eNodeB, determine that the first NAS procedure was unsuccessful due to a first NAS procedure failure, and, in response to the first NAS procedure being unsuccessful due to the first NAS procedure failure, select the alternate cell via a cell reselection process initiated by the computing device and attempt to perform a second NAS procedure via the alternate eNodeB.

In certain implementations, the first NAS procedure failure may include a failure of the serving eNodeB to respond to a random access (RA) preamble or to a radio resource control (RRC) connection request, a reject response by the serving eNodeB to the RRC connection request, or a failure of the MME to respond to a NAS request.

Figure 8:
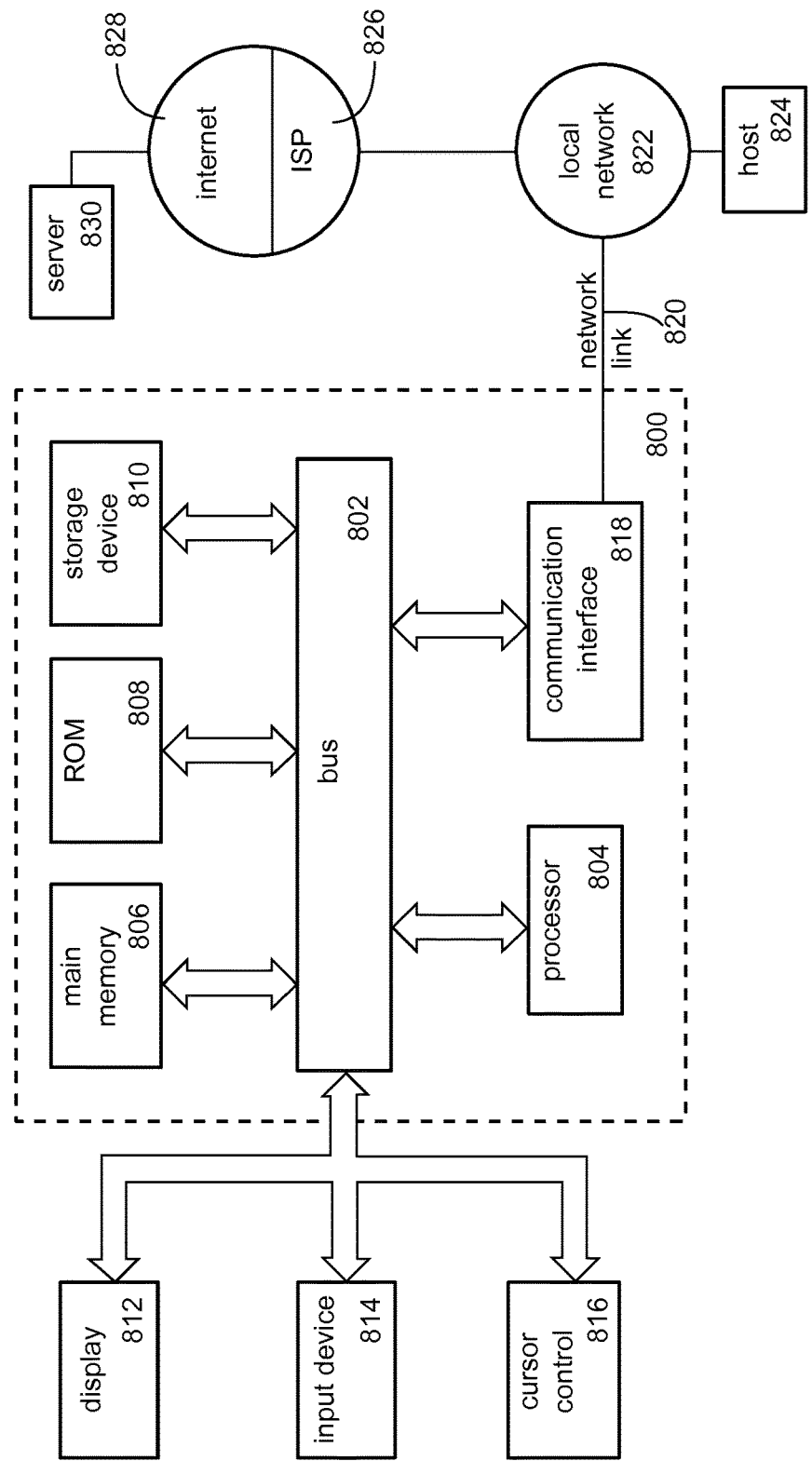
FIG. 8 is a block diagram that illustrates a computer system upon which aspects of this disclosure may be implemented.

FIG. 8 is a block diagram that illustrates a computer system 800 upon which aspects of this disclosure may be implemented, such as, but not limited to, UE 110, MME 140, and eNodeBs 120, 130, and 132. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT) or liquid crystal display (LCD), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. Another type of user input device is a touchscreen, which generally combines display 812 with hardware that registers touches upon display 812.

This disclosure is related to the use of computer systems such as computer system 800 for implementing the techniques described herein. In some examples, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In some examples, hardwired circuitry may be used in place of or in combination with software instructions to implement the various aspects of this disclosure. Thus, implementations are not limited to any specific combination of hardware circuitry and software.

The term "machine-readable medium" as used herein refers to any medium that participates in providing data that causes a machine to operate in a specific fashion. In some examples implemented using computer system 800, various machine-readable media are involved, for example, in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings. The foregoing description and drawings are accordingly to be regarded in an illustrative rather than restrictive sense.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A method comprising:
attempting, by a computing device capable of connecting to a long term evolution (LTE) cellular network, to perform a first non-access stratum (NAS) procedure via a serving eNodeB associated with a serving cell included in the LTE cellular network, the first NAS procedure including a radio access network (RAN) layer portion and a NAS layer portion;
determining that a first attempt to perform the first NAS procedure was unsuccessful due to a first NAS procedure failure; and
in response to the first attempt to perform the first NAS procedure being unsuccessful due to the first NAS procedure failure, selecting a first alternate cell included in the LTE cellular network and attempting to perform a second NAS procedure via a first alternate eNodeB associated with the first alternate cell,
wherein the selecting is initiated by the computing device,
wherein the first alternate cell is selected by determining a priority for the first alternate cell based upon a bandwidth, a signal strength, or a frequency of the first alternate eNodeB, and wherein the priority is additionally determined based on whether the computing device has previously failed to perform a NAS procedure via the first alternate eNodeB.

2. The method of claim 1, wherein:
the first NAS procedure failure includes a failure in the RAN layer portion of the NAS procedure.

3. The method of claim 2, wherein the RAN layer portion includes sending a random access (RA) preamble and sending a radio resource control (RRC) connection request, and wherein the first NAS procedure failure includes a random access channel (RACH) procedure failure.

4. The method of claim 3, wherein:
the RACH procedure failure includes a failure of the serving eNodeB to respond to the RA preamble.

5. The method of claim 3, wherein:
the RACH procedure failure includes a failure of the serving eNodeB to respond to the RRC connection request.

6. The method of claim 3, wherein:
the RACH procedure failure includes a reject response by the serving eNodeB to the RRC connection request, and the reject response does not include deprioritization instructions.

7. The method of claim 1, wherein:
the NAS layer portion includes sending a NAS request message and receiving a response to the NAS request message, and
the first NAS procedure failure includes a failure to receive a response to the NAS request message.

8. The method of claim 7, wherein the NAS request message includes an attach request, a tracking area update (TAU) request, or a service request.

9. The method of claim 1, wherein the computing device alternatingly attempts to connect via the serving eNodeB and the first alternate eNodeB.

10. The method of claim 9, wherein the first alternate eNodeB includes a single eNodeB associated with an alternate cell included in the LTE cellular network having highest priority after the serving cell.

11. The method of claim 1, wherein a second alternate eNodeB is associated with a second alternate cell included in the LTE cellular network, wherein the first alternate cell has a higher priority than the second alternate cell, and wherein the computing device attempts to connect via the first alternate eNodeB before trying to connect via the second alternate eNodeB.

12. The method of claim 11, wherein the computing device alternatingly attempts to connect via the serving eNodeB and via at least one of the first and second alternate eNodeB s.

13. The method of claim 11, further comprising determining priorities for the serving eNodeB, first alternate eNodeB, and second alternate eNodeB based upon signal strength, bandwidth, or frequency.

14. The method of claim 1, wherein the first alternate cell is selected by determining the priority of the first alternate cell based upon a combination of signal strength, bandwidth, and frequency of the first alternate eNodeB.

15. A non-transitory computer readable medium including instructions which, when executed by at least one processor included in the computing device, cause the computing device to perform the method of claim 1.

16. A device comprising:
a transceiver configured to transmit data to or receive data from a long term evolution (LTE) cellular network; and
a processor configured to:
attempt, via the transceiver, to perform a first non-access stratum (NAS) procedure via a serving eNodeB associated with a serving cell included in the LTE cellular network, the first NAS procedure including a radio access network (RAN) layer portion and a NAS layer portion,
determine that a first attempt to perform the first NAS procedure was unsuccessful due to a first NAS procedure failure, and
in response to the first attempt to perform the first NAS procedure being unsuccessful due to the first NAS procedure failure, select a first alternate cell included in the LTE cellular network and attempt to perform a second NAS procedure via a first alternate eNodeB associated with the first alternate cell,
wherein the first alternate cell is selected by determining a priority for the first alternate cell based upon a bandwidth, a signal strength, or a frequency of the first alternate eNodeB, and wherein the priority is additionally determined based on whether the computing device has previously failed to perform a NAS procedure via the first alternate eNodeB.

17. The device of claim 16,
wherein the first NAS procedure failure comprises one of a failure of the serving eNodeB to respond to a random access (RA) preamble or to a radio resource control (RRC) connection request, a reject response by the serving eNodeB to the RRC connection request, and a failure of a mobility management entity (MME) to respond to a NAS request.

18. A system comprising:
a computing device capable of connecting to a long term evolution (LTE) cellular network;
a serving eNodeB associated with a serving cell included in the LTE cellular network;
a mobility management entity (MME) included in the LTE cellular network; and
an alternate eNodeB associated with an alternate cell include in the LTE cellular network,
wherein the computing device is configured to:
attempt to perform a first non-access stratum (NAS) procedure via the serving eNodeB,
determine that a first attempt to perform the first NAS procedure was unsuccessful due to a first NAS procedure failure, and
in response to the first attempt to perform the first NAS procedure being unsuccessful due to the first NAS procedure failure, select the alternate cell via a cell reselection process initiated by the computing device and attempt to perform a second NAS procedure via the alternate eNodeB,
wherein the alternate cell is selected by determining a priority for the alternate cell based upon a bandwidth, a signal strength, or a frequency of the alternate eNodeB,
wherein the priority is additionally determined based on whether the computing device has previously failed to perform a NAS procedure via the alternate eNodeB, and
wherein the first NAS procedure includes a radio access network (RAN) layer portion and a NAS layer portion.

19. The system of claim 18,
wherein the first NAS procedure failure comprises one of a failure of the serving eNodeB to respond to a random access (RA) preamble or to a radio resource control (RRC) connection request, a reject response by the serving eNodeB to the RRC connection request, and a failure of the MME to respond to a NAS request.

20. The system of claim 18, wherein the computing device is further configured to alternatingly attempt to connect via the serving eNodeB and the alternate eNodeB.

* * * * *